（12） United States Patent
Domingues

US011206838B2

(10) Patent No.: US 11,206,838 B2
(45) Date of Patent: Dec. 28, 2021

(54) BATTER COMPOSITIONS, PACKAGED BATTER PRODUCTS, AND RELATED METHODS

(71) Applicant: General Mills, Inc., Minneapolis, MN (US)

(72) Inventor: David J. Domingues, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 2117 days.

(21) Appl. No.: 13/860,882

(22) Filed: Apr. 11, 2013

(65) Prior Publication Data

US 2014/0308399 A1    Oct. 16, 2014

(51) Int. Cl.
*A21D 10/04* (2006.01)
*A23D 7/005* (2006.01)

(52) U.S. Cl.
CPC ......... *A21D 10/045* (2013.01); *A23D 7/0053* (2013.01)

(58) Field of Classification Search
CPC .................. A21D 10/045; A23D 7/0053
USPC ......................... 426/61, 389, 549
See application file for complete search history.

(56) References Cited

U.S. PATENT DOCUMENTS

| | | | |
|---|---|---|---|
| 3,102,081 A | 8/1963 | Faucett et al. | |
| 3,620,763 A | 11/1971 | Hans | |
| 4,154,863 A * | 5/1979 | Kahn | A21D 10/045 426/327 |
| 4,353,932 A * | 10/1982 | Bone | A21D 10/04 426/532 |
| 4,397,879 A | 8/1983 | Wilson | |
| 4,963,368 A * | 10/1990 | Antrim et al. | 424/498 |
| 5,487,490 A | 1/1996 | Estes | |
| 5,667,107 A | 9/1997 | Lindsey | |
| 5,850,951 A | 12/1998 | Hayes | |
| 5,932,469 A | 8/1999 | Hillman | |
| 6,158,622 A | 12/2000 | Igarashi | |
| 6,207,411 B1 | 3/2001 | Ross et al. | |
| 6,217,929 B1 * | 4/2001 | Hahn | 426/549 |
| 6,759,070 B1 | 7/2004 | Narayanaswamy et al. | |
| 6,787,175 B2 | 9/2004 | Pedrick et al. | |
| 7,637,402 B2 | 12/2009 | Romanov et al. | |
| 8,063,687 B2 | 11/2011 | Lee | |
| 2004/0188310 A1 * | 9/2004 | Hamilton | B65D 33/01 206/524.8 |
| 2006/0093720 A1 * | 5/2006 | Tatz | 426/548 |
| 2006/0115566 A1 | 6/2006 | Bloechlinger et al. | |
| 2007/0042099 A1 | 2/2007 | Stanton | |
| 2008/0280003 A1 * | 11/2008 | Coyle | A21D 10/045 426/553 |
| 2009/0130352 A1 * | 5/2009 | Komiya et al. | 428/35.7 |
| 2009/0208615 A1 | 8/2009 | Domingues et al. | |
| 2009/0214709 A1 * | 8/2009 | Fuhrmeister et al. | 426/61 |
| 2009/0285890 A1 * | 11/2009 | Van Den Plas et al. | 424/484 |
| 2011/0070339 A1 | 3/2011 | O'Connor et al. | |
| 2011/0070341 A1 | 3/2011 | Richter | |
| 2011/0129575 A1 | 6/2011 | Li et al. | |
| 2013/0115357 A1 * | 5/2013 | Gamay | 426/548 |

FOREIGN PATENT DOCUMENTS

| | | |
|---|---|---|
| EP | 1532862 | 5/2005 |
| EP | 1912508 | 12/2012 |
| WO | WO-2002/037970 | 5/2002 |
| WO | WO-2004/068967 | 8/2004 |
| WO | WO-2007/130070 | 11/2007 |
| WO | WO 2007130070 A1 * | 11/2007 |

OTHER PUBLICATIONS

Coulthard et al., Biochem. J. 39, 24 (1945).
Whitaker, John R., "Principles of Enzymology for the Food Sciences", 2nd Ed., Ch. 21-27, p. 517 et. seq.

* cited by examiner

*Primary Examiner* — Bhaskar Mukhopadhyay
(74) *Attorney, Agent, or Firm* — Diederiks & Whitelaw, PLC; John L. Crimmins, Esq.

(57) ABSTRACT

Described are flour-based oil-in-water emulsion compositions, packaged emulsion compositions, and related methods, the emulsions being refrigerator stable in a non-pressurized package and optionally containing ingredients that include glucose oxidase, the package optionally being re-sealable.

18 Claims, 6 Drawing Sheets

ABATTER COMPOSITIONS, PACKAGED BATTER PRODUCTS, AND RELATED METHODS

FIELD OF THE INVENTION

The invention relates to flour-based batter compositions, packaged batter compositions, and related methods, the batters being refrigerator stable.

BACKGROUND

Pancakes and other batter-type dough products are often made from scratch or from a dry mixture of pre-combined ingredients (a "dry-mix") by which a consumer makes a batter by adding liquids to dry ingredients. The batter is then cooked soon after mixing. While these methods produce high quality baked goods, preparing the batter from dry ingredients, water, and optionally oil, can be time consuming. Also, the batter that is prepared can be used by the consumer for only a short time. The batters are not typically microbiologically stable if refrigerated unless they have been pasteurized, inerted, or stored under pressure; if not used immediately the batter will not produce a cooked product having optimum leavening action; and the batter will typically phase separate after a relatively short period.

Still, dry pancake mixes are very popular due to their convenience, and have become a food staple. A consumer combines a desired portion of a packaged dry pancake mix with water and optionally oil or eggs to produce a batter that takes the form of an aqueous mixture or suspension that can be poured or ladled onto a cooking surface to make a pancake. The mixture has desired rheology, including a low yield point, which allows the batter to flow and be poured onto a cooking surface. The batter also has leavening properties that result in expected volume of the cooked pancake. But the mixture must be used soon after its preparation and is not sufficiently stable to be stored and used at a later time. For example, the batter may phase separate. In addition, the batter will typically have a high water activity, e.g., 0.97 or higher, making it susceptible to microbial growth.

By some prior art methods, batter, dough, and other food products are processed by heat, freezing, or high or low pressure to improve ambient or refrigerated storage properties, e.g., to inactivate or kill microbes, spore, and other biologically active species such as microbes, bacteria, fungus, enzymes, proteins, yeast, mold, etc. Pasteurization processes (for a food product or food product ingredient) involve elevated temperature conditions for a time to reduce or eliminate active or potentially active microbes or spores from a food product. Freezing, high pressure, and vacuum processing are also used for similar purposes, as are the use of concentrated inert gas and low oxygen headspace atmospheres (i.e., "inerting"). These processing steps, while often effective and useful, add to the cost of commercial food products, and are preferably avoided if other means of improving storage can be effective.

As a very desirable improvement to the dry-mix batter products (for pancakes, waffles, and other batter products), interest exists in the commercial food products business for a batter that is pre-made and ready-to-use, being pre-mixed to contain water and all other dry and liquid ingredients and packaged for sale as a finished batter that is ready to be applied (e.g., poured or otherwise dispensed from a package) onto a cooking surface. Especially desired would be a ready-to-use packaged product that is contained in a re-sealable container, and that can be opened a first time (initially opened) by a consumer for a first portion of the batter to be removed and used (cooked), then closed and the batter stored at refrigeration for later use of the remaining portion of batter; the later use of the remaining portion (or portions) of batter would occur days or weeks after the consumer first opened the container. A successful consumer product would meet consumer expectations in terms of physical and performance properties of the batter throughout a reasonable refrigerated storage period, and would preferably exhibit stable package appearance by not bulging or collapsing during refrigeration. While such as product is understandably desired, many technological challenges have not previously been overcome to allow a product to exist and perform in a manner comparable to a fresh batter product, over weeks of refrigerated storage. No product of this type, that meets many or all of these product features, has (to the applicant's knowledge) previously been described, developed, or shown to be feasible.

SUMMARY

Described herein are practical ready-to-use packaged batter products, embodiments of which can exhibit refrigerated storage stability after initial preparation; during transportation, storage, and sale to a consumer; and also after an initial opening of the package and use of a portion of the batter by a consumer. The packaged product may be stable during refrigerated storage for many weeks after the packaged batter product is initially prepared (filled and sealed), such as for a period during which the initially filled and sealed packaged batter product is transported for sale, presented for sale and sold to a consumer, and then stored by the consumer with refrigeration before an initial opening and use by the consumer. Additionally, embodiments of described packaged batter products can thereafter be initially opened by the consumer, a portion can be used, and the package then containing a remaining amount of the batter can be re-sealed; the re-sealed package (with a portion of the original batter removed and a portion remaining in the package) can then be stored for a refrigerated storage period that can be in a range of weeks, e.g., up to or exceeding 12 weeks. During that refrigerated storage period, preferred embodiments of the described product allow the consumer to repeatedly re-open the package, remove a portion of the remaining batter, then seal the package again and store the re-sealed package. The result is a packaged batter product that exhibits weeks of refrigerated storage stability, without spoilage, after the initial opening of the package, during which multiple portions of the batter can be removed as separate portions for use on multiple occasions.

Storage stability can desirably include some or all of: freshness of the batter during refrigerated storage as measured by coloration, flavor, physical stability (not phase separating during storage; desired rheology such as yield point and flowability), organoleptic properties, cooking properties (i.e., leavening), and resistance to microbial growth; preferred batters throughout extended refrigerated storage periods may be capable of being cooked to exhibit taste, aroma, leavening, texture, coloration, etc., on par with a batter that is freshly made from scratch or from a dry-mix batter product; and preferred packaged batter products will exhibit dimensional stability by a package not ballooning or collapsing during refrigerated storage. As part of the dimensional stability of a packaged batter product, the product, before and after initial opening, can contain headspace gas of an amount and a constitution that does not cause the package to either collapse or bulge over a refrigerated storage period.

As a specific measure of refrigerated stability, certain preferred packaged batter products exhibit desirable and consistent rheology properties during a refrigerated storage period. For example, preferred batters can exhibit a yield point value (a.k.a. yield strength) that is similar to a freshly prepared batter of a similar product type (e.g., pancake, biscuits, muffins, cakes, brownies, waffle, crepe, etc.), e.g., will readily flow or pour and will otherwise cook and perform in a fashion comparable to a freshly prepared batter. Yield strength (yield point) is a value that may be used as a physical measurement to describe a batter, and the ability of a batter to easily flow. Yield strength of a material is often defined as the stress at which a material begins to deform plastically. Prior to the yield point the material will deform elastically and will return to its original shape when the applied stress is removed. Once the yield point is passed, some fraction of the deformation will be permanent. For purposes of the present description and claims, yield point is the amount of stress required to initiate batter movement, and can be measured using a Visco Tester VT550, and taken at 4 degrees Celsius.

Past and current refrigerated batter products commonly use a combination of humectants, gums, and hydrocolloids to stabilize the batter and reduce water activity. A result is a tendency of past and current refrigerated batters to possess significantly higher yield point values compared to a freshly prepared batter from a dry-mix. The higher-yield point batters, not surprisingly, do not flow as readily and can be more difficult and less convenient for consumers to dispense. Embodiments as described herein do not require and can preferably exclude gums and hydrocolloids, e.g., may contain less than 2 percent, e.g., less than 1 percent, or substantially no amount of hydrocolloid or gum ingredients.

Embodiments of batters as described herein can exhibit a relatively low yield strength value during refrigerated storage before initial use by a consumer, and also after initial use by a consumer after one or multiple portions of batter are removed from the package and the package is re-sealed and refrigerated. The desired yield strength can be achieved in combination with microbiological stability, and storage stability of a closed or re-closed package containing the batter. The yield strength can be sufficiently low to allow easy flow and dispensing from a squeeze bottle or similar container. For example, a desired batter may exhibit a yield point (Pascals) of below 100 Pascals, preferably below 80 Pascals, more preferably below 50, below 20, or below 10 Pascals, upon initial preparation and also during a refrigerated storage period either before or after initial use (i.e., initially opening and re-sealing of a package one or more times) by a consumer.

Batter compositions, to achieve these desired physical, performance, and stability properties, can be formulated to exhibit a reduced water activity, can be prepared to form a stable emulsion, and can include an oxidoreductase enzyme. Desirably and advantageously, it has been discovered that certain combinations of ingredients can be included in a batter to also retain desired rheology, and to provide storage stability such as allowing the package to be opened and re-sealed, then refrigerated without the package collapsing ballooning. Certain preferred batters can simultaneously exhibit a combination 1) a low $A_w$ value (not in excess of 0.93), to effect microbial stability, and 2) a low yield point value enabling the batter to flow readily upon application (looks and performs more similarly to a much higher aw freshly prepare batter products). Furthermore, this unique low $A_w$ and low yield point batter system is accomplished without using an excess of humectants material (low humectants/moisture ratio) and preferably without a hydrocolloid or gum ingredient.

Batters as described can include ingredients such as flour, water, chemical leavening agent, sugar, optional non-sugar water-activity reducing agent (i.e., humectant, preferably of a relatively low molecular weight), and fat (preferably oil, which is liquid at room temperature). To achieve storage stability in combination with desired final (cooked) product properties, the batter can optionally include additional ingredients such as one or more of oxidoreductase enzyme, antimicrobial agent (e.g., natural antimicrobial agent), and emulsifier. Preferred batter formulations include ingredients such as these in amounts to prepare a ready-to-use, pre-mixed refrigerated packaged batter product that is physically and microbiologically stable for a refrigerated storage period as described herein (e.g., up to 12 weeks), and that exhibits rheological and cooking properties similar to a freshly prepared batter (e.g., from a dry-mix or from scratch) during such a refrigerated storage period.

Preferred batters can exhibit a low water activity to effect reduced microbial activity and extended refrigerator storage stability. In the past, low water activity has been achieved by use of humectants, which can produce undesirable rheology such as viscosity or yield point that are higher than freshly prepared batters; this undesirably rheology also results in poor baked product characteristics as the product age increases. According to embodiments of the described batters, a combination of low water activity and desirable rheology (e.g., comparable to freshly prepared batters) can result from the use of a combination of relatively low molecular weight sugars and (if present) low molecular weight non-sugar water-activity reducing agents, and reduced water content by using a higher relative amount of oil and a relatively reduced amount of water.

An active enzyme system (oxidoreductase, e.g., glucose oxidase) can be included in a batter to remove oxygen from the package headspace atmosphere thereby preventing poly phenol oxidase discoloration and reducing microbial activity. An advantage now also identified with the use of oxidoreductase enzyme (e.g., glucose oxidase), and the resultant removal of molecular oxygen gas from a package headspace (air is about 21 percent oxygen), is that batters contained in the package have been found to out-gas a similar molar volume of carbon dioxide, but not more, so the internal pressure of the package does not build and the package does not balloon.

Embodiments of batters as described herein can be sold commercially as packaged, ready-to-use batters, e.g., pancake batters. These batters can be contained in a re-sealable package, and as such can exhibit shelf stability that allows refrigerated storage of the packaged batter product for many weeks, even if the package is opened during that period to allow a portion of the batter being used. The product is useful over a period of weeks of refrigerated storage, allowing multiple uses of separate portion of the contained batter. The package that contains the batter can be opened, a portion of the contained batter can be used, and the package can be re-closed so the remainder of the batter can be stored within the re-closed package for later use, and with the package and batter remaining stable. After the package is initially opened, and a portion of the batter used, the remaining packaged batter can stay fresh in terms of coloration, flavor, physical stability (not separating during storage), and organoleptic properties during refrigerated (e.g., 38 to 45 degrees Fahrenheit) storage periods of 2, 4, 6, 8, 10, 12 weeks, or longer. The batter, during the refrigerated storage period (after being first opened), is capable of being cooked to a cooked product that has taste, aroma, texture, leavening (i.e., baked volume), coloration, etc., on par with a batter freshly made from scratch or from a dry-mix product just after preparation. Herein, the term "baked volume" or "baked specific volume" refers to volume or specific volume of a cooked (e.g., baked or fried) product. Baked specific volume of a pancake can be measured as the average spread and height of four pancakes, each prepared from one-quarter cup batter; a desired average bake spread (e.g., diameter) of the four pancakes can be in a range from 300 to 350 millimeters (mm) and an average height (of four cooked pancakes) in a range from 50 to 70 mm.

According to certain embodiments of the packaged batter product, the packaged product can be stored in an initially filled and sealed condition at a refrigerated condition (e.g., from 38 to 45 degrees Fahrenheit) for an extended period, such as for a refrigerated storage period of at least 2, 4, 6, 8, 10, 12, or more weeks at a refrigerated temperature. The packaged product is sufficiently stable that the product can be prepared commercially, transported, stored, and sold as a consumer food product, and specifically can retain desired properties as described herein, such as desired rheology, bake properties, emulsion stability, and package dimensions, during such a refrigerated storage period.

According to certain embodiments of the packaged batter product can also be stable upon refrigeration after the initially filled and sealed package is initially opened, meaning that the initially filled and sealed package can be initially opened, batter (a portion of the total batter) can be removed, the volume of the removed portion of the batter in the package can be replaced by air, the package can be resealed or re-closed, and the re-sealed package can be stored a refrigerated condition (e.g., from 38 to 45 degrees Fahrenheit) for an extended refrigerated storage period, such as a refrigerated storage period of at least 2, 4, 6, 8, 10, 12, or more weeks at a refrigerated temperature.

The packaged product (before or after an initial use by a consumer, and before or after removal of a portion of batter) is sufficiently stable that the product can be held at refrigerated condition and still maintain desired properties of a consumer food product. Some of these can quantified as: an internal package pressure in a range from 11 to 17 psi, e.g., from 13 to 16 psi (atmospheric pressure is about 14.6 psi); an absence of substantial phase separation of the batter product; a yield point that does not exceed 100 Pascals, e.g., that does not exceed 50 Pascals, or that does not exceed 10 or 15 Pascals; and a batter content that can be cooked to a desired cooked product such as a desired baked specific volume. Baked specific volume of a pancake can be measured as the average spread of four pancakes, each prepared from one-quarter cup batter; a desired average bake spread of the four pancakes can be an average height (of four cooked pancakes) in a range from 50 to 70 millimeters inches and an average spread (of the four cooked pancakes) in a range from 300 to 350 millimeters.

In one aspect, the invention relates to an edible oil-in-water emulsion (e.g., a refrigerator-stable chemically leavened batter) that includes flour, sugar, acidic chemical leavening agent, basic chemical leavening agent, oil, water, and emulsifier, in the form of an oil-in-water emulsion, and having a water activity below about 0.93. The emulsion or batter may have a water activity below about 0.93 in combination with a yield stress of not greater than 20 Pascals, a sugar to water ratio in a range from 0.3/1 to 0.9/1, or both of the specified yield point and sugar to water ratio.

In another aspect the invention relates to a packaged edible oil-in-water emulsion, e.g., a packaged refrigerated batter product. It includes a chemically-leavened batter in a re-sealable package. The package has an interior volume and a re-sealable closure. The emulsion or batter includes flour, water, oil, chemical leavening agent, and oxidoreductase enzyme, and is in the form of an oil-in-water emulsion.

In another aspect, the invention relates to a method of using a packaged edible oil-in-water emulsion (e.g., batter) product. The packaged emulsion or batter product includes a package with a re-sealable closure and an internal volume that contains edible emulsion (e.g., batter) made of ingredients that include flour, sugar, non-sugar water-activity reducing agent, acidic chemical leavening agent, basic chemical leavening agent, oil, water, and emulsifier, in the form of a stable emulsion. The method includes: opening the package by opening a re-sealable closure; removing a portion of the batter from the package in a manner that increases headspace in the package; allowing air to fill the increased headspace; re-closing the re-sealable closure so the package contains the increased headspace filled with air; and storing the re-closed package at a refrigerated condition.

In another aspect the invention relates to a method of preparing an edible oil-in-water emulsion. The method includes: providing ingredients that include flour, sugar, acidic chemical leavening agent, basic chemical leavening agent, oil, water, and emulsifier; combining the ingredients; and emulsifying the ingredients to form an edible oil-in-water emulsion, wherein the emulsion has a water activity below about 0.93. The emulsion or batter may have a water activity below about 0.93 in combination with a yield stress of not greater than 20 Pascals, a sugar to water ratio in a range from 0.3/1 to 0.9/1, or both of the specified yield point and sugar to water ratio.

DETAILED DESCRIPTION

Described are ready-to-use, pre-mixed and pre-made packaged batter products having refrigerated storage stability. Embodiments can exhibit refrigerated storage stability after initial preparation, and also after an initial use by a consumer, meaning an initial opening and use of a portion of the batter in the package. The packaged product may be stable during refrigerated storage for many weeks after the packaged batter product is prepared, initially placed in a package, and the package is sealed (i.e., the package is "initially filled and sealed"). For example, the packaged product (after initially being filled and sealed and before being first opened by a consumer, at which time air will be introduced into the package) may exhibit refrigerated storage stability for a period of up to 12 weeks, during which the initially filled and sealed packaged batter product may be transported for sale, presented for sale and sold to a consumer, and then stored by the consumer with refrigeration.

Additionally, embodiments of described packaged batter products can be opened for a first time by a consumer after sale (i.e., "initially opened"), a portion can be used, and the package then containing a remaining amount of the batter can be re-sealed; the re-sealed package (with a portion of the original batter removed and a portion remaining in the package) can then be stored for a refrigerated storage period that can be in a range of weeks, e.g., up to or exceeding 12 weeks. During that period, preferred embodiments of the described product allow the consumer to repeatedly re-open the re-sealed package and remove another portion of the remaining batter, the re-seal the package again.

Refrigerated stability means that a batter of a ready-to-use packaged batter product can appear and perform in a manner that is comparable to a freshly made batter product of a similar type, and can be physically and microbiologically stable for lengthy (e.g., up to or in excess of 12 weeks) refrigerated storage periods. The batter can exhibit a stable physical form in the form of an emulsion (which specifically also includes a batter considered to be stable suspension) that does not phase separate or coalesce during the refrigerated storage period. Additionally or alternately, the batter can exhibit stable rheology as described herein by maintaining a desirably low yield point during extended refrigerated storage. Additionally or alternately the batter can exhibit desired cooking performance, such as the ability to be cooked to a desired baked specific volume of a pancake, as described herein. And the batter should exhibit otherwise acceptable flavor, aroma, texture, and look of an uncooked and cooked batter product. The package of the refrigerator stable packaged products can exhibit dimensional stability, including that the package does not experience undue expansion or collapse due to changes in the chemical makeup or changes in the gaseous composition of the batter product during a refrigerated storage period.

The term "batter" is used in a manner consistent with its meaning in the cooking and food technology arts to refer to a raw (uncooked), flour-and-water food product that is leavenable ("leavened") by chemical leavening agents, is less viscous than a "dough" (e.g., a bread or a cookie dough), and has a higher water content than a dough. Pancake, waffle, crepe, muffin, and cake batter are examples of types of batters, as compared to dough.

Preferred batters as described can be capable of being poured or ladled onto a cooking surface, such as is typical of a pourable, e.g., pancake batters, waffle batter, crepe batter. According to packaged batter products as described, the batters can be poured, ladled, or optionally squeezed from a squeeze package onto a cooking surface. To be capable of being poured or squeezed from a squeeze container onto a cooking surface, a batter can exhibit a yield point (which is a rheological property) that allows pouring or squeezing from a package, i.e., can exhibit a yield point that is below a maximum yield point level at which pouring or squeezing is no longer possible. Upon depositing onto a cooking surface, the batter must spread to a desired dimension to yield a cooked product of desired size. A yield point level that is desirable for a product as described, capable of being squeezed onto a cooking surface from a package and spreading to a desired extent, is a yield point that is below about 100 Pascals, below 50, 20, or 10 Pascals. The batter can exhibit a yield point in this range as prepared, as initially placed in a package (during manufacture), during an initial refrigerated storage period (e.g., up to about 12 weeks) before consumer use, and during a refrigerated storage period following initial opening of the package and removal of a portion or multiple portions of the batter from the initially filled and sealed package.

Exemplary batters can also exhibit a relatively lower water activity level compared to some other batter compositions, including pancake batters freshly made from scratch or from a dry-mix, which generally exhibit a water activity in a range above about 0.96. A relatively low water activity reduces potential microbial activity within a refrigerated batter and improves refrigerated storage stability. In general, a batter as described can have a water activity of about 0.93 or lower, e.g., about 0.92 or lower, e.g., from about 0.85 or 0.88 to about 0.92. If the water activity is higher, microbial stability over extended time periods may be reduced. If the water activity is lower, microbial stability under refrigeration temperatures may be satisfactory, but the amount of available water may be so low that the resulting cooked batter product may not have a high volume and fluffy texture and may be unacceptably dry.

Water activity ($A_w$) refers to the amount of water in a food product (such as a batter) that is available to microorganisms. Water activity is a measure of how efficiently a portion of the total amount of water present in a food product can take part in a chemical (physical) reaction, and is sometimes considered to measure the "free," "unbound," or "available" water in a system. Water that is tightly bound or tightly associated with a chemical constituent of a food composition, e.g., is tightly bound to a protein molecule, is not available for alternate use, is not "free" or "available" water. Water activity refers to the amount of water in a food or beverage that is not so tightly bound that the water is unavailable. Water activity ($A_w$) is defined as:

$$A_w = P/P_o$$

where P and $P_o$ are the partial pressure of water above the food, and the partial pressure of water at identical conditions, respectively. Any tightly bound water does not escape from the food as a vapor, and therefore exerts no partial pressure and has an effective water activity of zero. Water activity is a function of the composition of a food product, and is also a function of temperature. The approximate water activities of a chemically leavened pancake batter freshly prepared from a dry-mix, by combining the dry-mix with water, is at least 0.96, e.g., about 0.97 or about 0.98.

Batters as described herein contain flour, water, sugar, fat (especially liquid oil), and a chemical leavening system that includes basic chemical leavening agent and acidic chemical leavening agent. A flour component contributes to the structure of the batter. A variety of different flours may be used, and different flours can be selected to give a variety of textures, tastes, and appearances to the final cooked batter product. Useful flours include hard wheat flour, soft wheat flour, corn flour, high amylose flour, and low amylose flour. A single flour type may be useful, or a combination, with the relative proportions of types of flours being varied as desired. Batters as described herein can include any amount of flour to perform as described, such as from about 20 to about 30 weight percent flour, e.g., from about 23 to about 27 weight percent flour, e.g., from about 24 to about 26 weight percent flour, based on the total weight of the batter.

Flour may be natural flour (directly derived from a grain). The flour may alternately be what is sometimes referred to as an "artificial" flour, which is a combination of natural flour constituents provided, for example, by a combination separated concentrated protein and starch ingredients. See patent document WO 2007/130070. According to preferred batter composition, a natural flour is used in a batter, as opposed to an "artificial" flour.

Acidic chemical leavening agent and basic chemical leavening agent can be included in the batter to produce carbon dioxide during cooking, for leavening. The basic chemical leavening agent may be any useful basic agent known in the baking arts, including baking soda (sodium bicarbonate) and other know basic salts such as potassium bicarbonate. The basic agent may be encapsulated or non-encapsulated. The amount of basic chemical leavening agent may be any useful amount, such as an amount in the range from about 0.55 to about 0.95 weight percent, e.g., from 0.65 to 0.85 weight percent basic chemical leavening agent, based on total weight batter.

A variety of acidic chemical leavening agents are also known in the cooking and baking arts and commercially available, and include sodium or calcium salts of ortho, pyro, and complex phosphoric acids in which at least two active hydrogen ions are attached to the molecule. Baking acids include monocalcium phosphate monohydrate (MCP), monocalcium phosphate anhydrous (AMCP), sodium acid pyrophosphate (SAPP), sodium aluminum phosphate (SALP), dicalcium phosphate dihydrate (DPD), dicalcium phosphate (DCP), sodium aluminum sulfate (SAS), glucono-delta-lactone (GDL), potassium hydrogen tartrate (cream of tartar) and the like. A preferred leavening system for pancake batter as described herein can includes sodium aluminum phosphate and non-encapsulated baking soda. The amount of acidic chemical leavening agent may be any useful amount, such as an amount in the range from about 0.4 to about 0.8 weight percent, e.g., from 0.5 to 0.7 weight percent acidic chemical leavening agent, based on total weight batter.

Sugar can be present in the batter composition to provide sweetness, to lower the water activity of the batter, or for both of these purposes. Sugars of any type and size (e.g., molecular weight) can be useful in a batter. As a general matter, a batter as described can preferably include sugars that exhibit a comparatively lower molecular weight such as small mono-, and disaccharides (sucrose, fructose), as opposed to sugars having a comparably higher molecular weight, e.g., maltodexrins and corn syrup solids. The higher molecular weight sugars can preferably be avoided or their use minimized, because higher molecular weight sugars can result in a batter having a higher yield point. A batter will achieve a greater water-activity reduction by use of a lower molecular weight water-activity reducing agent, along with the lessened impact on viscosity (lower yield points).

According to certain described batters that include a portion of water replaced with an amount of oil, the amount of sugar present (for a given amount of water, and for a given water activity of a batter) can be comparatively reduced because the batter can be emulsified using oil, resulting in a need for less total water and, therefore, less sugar included to function as a water-activity reducing agent. For example, many dry mix batters have higher water activity; the amount of sugar of exemplary batters as described, which include relatively reduced water and increased oil, is less than an amount of sugar that would be present if the amount of water were higher and oil lower.

Useful sugars generally include any saccharides, including monosaccharides, disaccharides, polysaccharides, and their various degradation products. Examples include the pentoses, xylose, arabinose, glucose, galactose, mannose, fructose, sorbose, lactose, maltose, dextrose, sucrose, maltodextrins, high fructose corn syrup (HFCS), molasses, honey, brown sugar, and the like. Of these, preferred sugars are lower molecular weight sugars, especially mono-saccharides and di-saccharides such as sucrose, glucose, galactose, mannose, lactose, maltose, and fructose.

Preferred sugars for use in embodiments of batters designed to exhibit a desirably low viscosity and yield point can be relatively lower molecular weight sugar such as mono-saccharides and di-saccharides. In such embodiments, preferred sugars include mono-saccharides and di-saccharides such as sucrose, glucose, galactose, mannose, lactose, maltose, and fructose, and combinations of these. In preferred batters, at least about 50 weight percent, for example from about 50 to about 95 weight percent, of the total sugar in a batter can be one or a combination of di-saccharides such as sucrose. More preferably, at least about 70 weight percent, for example from about 73 to about 90 weight percent, of the total amount of sugar in the batter can be one or a combination of di-saccharides such as sucrose.

Certain embodiments of batters include only mono-saccharides, di-saccharides, or a combination of these, and not more than a relatively small amount (if any) of other higher-level polysaccharides (i.e., tri-saccharides or polysaccharides). Preferred batters can contain sugar that consists of mono-saccharides, di-saccharides, or a mixture of these, such as sucrose, glucose, galactose, mannose, lactose, maltose, and fructose, meaning any single one of these or a combinations of two or more mono-, and di-saccharides. Alternately, a batter can contain sugar that consists essentially of mono-saccharides, di-saccharides, or a combination, such as sucrose, glucose, galactose, mannose, lactose, maltose, and fructose, and combinations of these. Accordingly, batters can contain sugar that either consists of or consists essentially of mono-and di-saccharides and no other saccharides. A batter that contains only mono- and di-saccharides (a single type or a combination) and no additional forms of sugar, is considered to contain sugar that consists of mono- and di-saccharides. A batter that contains mono- and di-saccharides (a single type or a blend thereof) and no more than 2 percent by weight, e.g., less than 1 percent by weight, additional (added) saccharide material, based on the total weight of the batter, is considered to contain sugar that consists essentially of mono- and di-saccharides.

The batter may contain any useful amount of total sugar for use as a sweetening ingredient, water-activity reducing agent, or a combination of these two, with a suitable range for many batters being from about 2 to about 10 weight percent total sugar, for example from about 3 to about 7 weight percent total sugar (present to function as a sweetening agent, water activity reducing agent, or both), this amount referring to a total amount of sugar (e.g., saccharides) in a batter composition, the sugar being a single sugar compound or a mixture of two or more different sugar compounds. More preferably, some embodiments of batter may contain from about 4 to about 6 weight percent sugar based on the total weight of the batter.

Optionally, in addition to sugar as a water-activity reducing agent, other known water-activity reducing agents can be used in an amount to reduce water activity without increasing sweetness (referred to herein as "non-sugar water activity reducing agents"). For example, a polyhydric alcohol such as glycerol (glycerine) can be present as an additional water binding agent (i.e., humectant, or water-activity reducing agent). To achieve desirably low viscosity and yield point, a batter can include low molecular weight non-sugar water-activity reducing agent (desirably in combination with relatively lower molecular weight sugar, as previously described). A non-sugar water-activity reducing agent can be a material that is not a sugar, and that is understood to reduce water activity of a food (e.g., batter), i.e., to act as a humectant. Examples include alcohols and polyols such as glycerine, sorbitol, and similar organic mono- and polyhydric alcohol compounds. An alcohol or polyol that may be considered to exhibit a low molecular weight, for purposes of avoiding an undue increase in viscosity and yield point, can be an alcohol or polyol compound that contains 8 or fewer carbon atoms, preferably 6 or fewer carbon atoms. Accordingly, sorbitol and glycerine are considered to be low molecular weight non-sugar water-activity reducing agents.

Certain embodiments of batters include only low molecular weight non-sugar water-activity reducing agents, and do not include any non-sugar water-activity reducing agents that would not be considered to have a low molecular weight, e.g., that contain more than 8 carbon atoms. Preferred batters can contain non-sugar water-activity reducing agent that consists of low molecular weight non-sugar water-activity reducing agent such as sorbitol, glycerol, or a mixture of these optionally with other low molecular weight non-sugar water-activity reducing agents. Alternately, a batter can contain non-sugar water-activity reducing agent that consists essentially of low molecular weight non-sugar water-activity reducing agents such as sorbitol, glycerol, or a mixture of these optionally with other low molecular weight non-sugar water-activity reducing agents. Accordingly, batters can contain non-sugar water-activity reducing agent that either consists of or consists essentially of low molecular weight non-sugar water-activity reducing agent or agents. A batter that contains only low molecular weight non-sugar water-activity reducing agent or agents and no additional forms of non-sugar water-activity reducing agent, is considered to contain non-sugar water-activity reducing agent that consists of low molecular weight non-sugar water-activity reducing agent. A batter that contains low molecular weight non-sugar water-activity reducing agent or agents and no more than 2 percent by weight, e.g., less than 1 percent by weight, of additional (added) non-sugar water-activity reducing agents, based on the total weight of the batter, is considered to contain non-sugar water-activity reducing agent that consists essentially of low molecular weight non-sugar water-activity reducing agents.

The batter may contain any useful total amount of non-sugar water-activity reducing agent, e.g., low molecular weight non-sugar water-activity reducing agent, with a suitable range for many batters (if present at all) being in an amount of up to about 15 weight percent of the batter, e.g., from about 9 to about 13 weight percent of the batter or from about 10 to about 12 weight percent of the batter.

Water is present in a batter composition as described, in combination with amounts of sugar, optional non-sugar water-activity reducing agent, and oil, to produce a raw batter having a desired (relatively reduced) water activity, and desired flow properties (e.g., yield point to allow flow as described). The amount of water in the batter can be relatively lower than the amount of water in some other comparable batters, such as pancake batters made from scratch or from conventional dry-mixes, due to the use of a relatively higher amount of oil. For example, a batter may contain from about 32 to about 44, e.g., from about 30 to about 48, from about 36 to about 40 weight percent water, or from about 37 to about 39 weight percent water.

A ready-to-use batter as described can also exhibit a sugar-to-water ratio that is lower than some other ready-to-use batters, in combination with uniquely lower yield point values. Examples of useful sugar-to-water (by weight) ratios of batters as described (sugar/water), with preferred such batters also exhibiting desirably low yield point (as described), can be in a range that is below 0.9/1, e.g., below 0.8/1, e.g., from about 0.7:1 to about 0.3/1, e.g., from 0.6:1 to 0.4:1.

A batter also includes fat, which can preferably be in the form a liquid fat (oil) at room temperature, and is preferably capable of forming an oil-in-water emulsion at room temperature. The oil can have beneficial effects on the volume, grain, and texture of the uncooked batter product, as well as the texture, mouthfeel and other organoleptic properties of the cooked batter.

Oil is also useful in a batter composition as described to function as a replacement for a portion of a total amount of water otherwise used in many types of batter and, thereby, effect a reduced water activity. The replacement of some water with oil can be effective to reduce the water-activity of the batter, while not unduly otherwise affecting other product features such as flow properties (e.g., yield point) or baked performance. A relatively increased oil content in a batter also allows the batter to be formed into a stable emulsion that can exhibit improved stability in an enclosed package during refrigerated storage.

Without being bound by theory, oil may also be effective to increase the stability of a batter contained in a closed package. Oil may coat, encapsulate (in liquid phase droplets), or otherwise sequester some portion of acidic and basic chemical leavening agents in a manner that may prevent those chemical leavening agents from dissolving or otherwise contacting each other and reacting during refrigerated storage. By preventing their reaction during refrigerated storage, the chemical leavening agents are prevented from reacting to produce carbon dioxide in the closed package, which reduces the potential for pressure build within the package during refrigerated storage.

Animal and vegetable-based natural fats and oils can be useful, as can synthetic oils. Certain examples of useful oils include oils (liquid at room temperature) that are know to be useful in the food arts, including unsaturated vegetable oils, cottonseed oil, nut oil, soybean oil, sunflower oil, rapeseed oil, sesame oil, olive oil, corn oil, safflower oil, palm oil, palm kernel oil, coconut oil, and combinations thereof. These oils can be used alone or in combination as the oil component of a batter. Butter is also a useful fat, and can provide flavor to the batters and finished baked food product. A batter as described can include any desired and useful amount of oil, with examples of useful amounts being from about 4 to about 12 weight percent oil, e.g., from about 6 to about 10 weight percent oil, or from about 7 to about 9 weight percent oil, based on the total weight of the batter.

A batter as described can contain oxidoreductase enzyme to reduce microbial activity and prevent discoloration during refrigerated storage. Advantageously, the oxidoreductase enzyme can also to manage the chemical makeup and amount of gas in a headspace of a packaged batter product. A batter that contains glucose oxidase in an effective amount can be particularly useful in a batter of a packaged batter product, to allow for or improve refrigerated storage stability in the form of dimensional stability of the a closed package containing the batter (before and after initially being opened by a consumer), and freshness of the batter (also before and after being initially opened).

Oxidoreductase enzyme can be used to manage headspace in a closed package that contains batter (and headspace) by facilitating a reaction between oxygen and a substrate (e.g., sugar), to consume oxygen and prevent the oxygen from being available for microbial, enzymatic, or other oxidative reaction or use. Consuming oxygen also prevents the oxygen from increasing pressure within the container in a manner that would cause the closed container to balloon during refrigerated storage. More generally, the oxidoreductase enzyme has been found to result in an relatively stable gaseous headspace that does not experience an undue increase or decrease in pressure within the closed refrigerated package, either before or after an initial use of the package, e.g., even after a package has been opened, a portion of batter has been removed, and the headspace has been filled with an amount of ambient air. During a refrigerated storage period, a packaged batter product can contain headspace and batter, and the pressure within the package can remain relatively stable, such as by remaining in a range between 13 and 16 psig, e.g., between 13.5 and 15.5 psig, or otherwise within about 10 percent of ambient pressure. A pressure that remains within a range that is within 10 percent of (above or below) ambient pressure can result in a packaged batter product, before and after initial opening and removal of a portion of batter from the package, that does not balloon or collapse due to a pressure differential between the inside and the outside of the package.

Oxidoreductase enzymes are generally known and are described, for example, at Whitaker, John R., *Principles of Enzymology for the Food Sciences*, $2^{nd}$ Ed., Chapters 21-27, p. 517 et. seq. Examples of oxidoreductase enzymes include glucose oxidase, hexose oxidase, and lactate dehydrogenase, among others. A batter as described can optionally and preferably include an amount of oxidoreductase enzyme that is effective to manage the type and amount of gas in a headspace of a closed package that contains the batter, including controlling the amount of gas present in the package headspace to prevent an undesired pressure build (and ballooning of the package) or pressure decrease (and collapse of the package).

The packaged batter product can contain an amount of headspace that varies throughout the use of the product. Oxidoreductase enzyme in the batter can be effective to manage the headspace (e.g., internal package pressure) over the course of the batter product use, including after removal of one or multiple portions of batter from the initially sealed and filled package and subsequent refrigerated storage of the remaining batter. Before initial opening by a consumer, the amount of headspace in the packaged batter product will be relatively low, such as below about 20 percent by volume, e.g., below 10 percent or below 5 percent. After a consumer initially opens the package to remove a first portion of batter, the amount of headspace in the package will increase by an amount equal to the volume of batter removed. This headspace will be replaced by ambient air. Glucose oxidase contained by the remaining amount of batter in the package can continue to manage the increased package headspace, preventing an undesired pressure build (and ballooning of the package) or pressure decrease (and collapse of the package), during subsequent refrigerated storage. Also, the remaining glucose oxidase continues to prevent discoloration by effectively removing oxygen introduced into the headspace by the ambient air.

According to preferred packaged batter products, glucose oxidase can manage any amount of headspace in a package (that also contains any amount of a remaining portion of batter), including any headspace that might result upon a consumer using a first portion of batter and re-closing the package for refrigerated storage, or headspace that might result upon a consumer using a second or third (or subsequent) portion of batter and re-closing the package for refrigerated storage. The headspace may increase from an initial headspace of below 20 or 10 percent to, for example, a headspace of from 20 to 40 percent, a headspace from 40 to 60 percent, or a headspace of from 60 to 80 percent of the internal volume of the package. A batter can contain an amount of oxidoreductase enzyme that will control an amount of gaseous headspace in any such headspace volume, to prevent an undesired pressure build (and ballooning of the package) or pressure decrease (and collapse of the package) during a refrigerated storage period.

A glucose oxidase activity unit is defined as the amount of enzyme causing the oxidation of 1 micromole of glucose per minute at 25° C. at pH 7.0. Glucose oxidase for commercial use is also known as β-D-Glucopyranose aerodehydrogenase, DeeO™, Fermcozyme™, OxyBan™, Gluzyme™ (e.g., Gluzyme™ 10000BG from Novozymes™), and Ovazyme™. Glucose oxidase can be obtained for commercial purposes from *Aspergilli* and *Penicillia*. Isolation of glucose oxidase from *Aspergillus niger* is described in U.S. Pat. No. 3,102,081 (1963 to Miles Lab). Isolation of glucose oxidase from *Penicillia* cultures is described by Coulthard et al, in *Biochem. J.*39, 24 (1945).

The amount of oxidoreductase enzyme that can be included in a batter, for the purpose of providing refrigerated storage stability of a packaged batter product, can be can be any amount that will be effective to react with and consume oxygen to control the amount (i.e., pressure) of gas in the package headspace and prevent an undesired pressure build (and ballooning of the package) or pressure decrease (and collapse of the package). Exemplary amounts of glucose oxidase as an oxidoreductase enzyme, for use in a batter and packaged batter product as described, can be in the range from about 0.25 to about 1, e.g. from about 0.3 to about 0.7, glucose oxidase activity units (GODU) per gram batter. If the glucose oxidase is provided as the commercial product Gluzyme™ 10000, having 10000GODU/gram, then an amount of the Gluzyme™ 10000 ingredient in a range from about 0.001 to about 0.009 weight percent Gluzyme™ 10000 may be useful, based on the total weight of the batter, or from about 0.003 to about 0.007 weight percent Gluzyme™ 10000 based on the total weight of the batter.

A batter can also contain antimicrobial agent of a type that is safe in food products, and effective to inhibit microbial growth. Examples include natural antimicrobial agent, meaning naturally derived antimicrobial agent used to stabilize food items naturally and safely. Useful natural antimicrobial agents may reduce or eliminate certain yeasts, molds, bacteria, and combinations thereof. Preferred natural antimicrobial agents may include one or more secondary fermentation by-products of a bacteria derived by the bacteria metabolizing an organic substrate such as a protein (e.g., a dairy protein), a sugar, or a fat. See PCT patent application WO 2004/068967 "Dough Compositions Comprising Encapsulated Organic Acid and Natural Antimicrobial Agent," published Aug. 19, 2004, the entirety of which is incorporated herein by reference.

Natural antimicrobial agents can include fermentation by-products of dairy proteins and other substrates. In general, such fermentation by-products capable of being used as natural antimicrobial agents can be produced by combining a substrate and a suitable amount of biological bacteria cells in amounts and in an environment that allow fermentation of the substrate by the bacteria to produce an antimicrobial by-product. Exemplary fermentation by-products used as natural antimicrobial agents include organic acids, lantibiotics, *Pediococcus* bacterial metabolite, lacticin (e.g., Lacticin 3147; see, U.S. Pat. No. 6,207,411), and similar materials.

Alternately or in addition, organic acids may be included in a dough composition to inhibit microbes such as yeast and molds, examples including sorbate, propionate, and the like.

Examples of fermentation by-products of the type that may be useful as natural antimicrobial agent in a batter or packaged batter product as described include lantibiotics. Exemplary lantibiotics include nisin, subtilin, pep 5, epidermin, mutacin (see, U.S. Pat. No. 5,932,469), gallidermin, cinnamycin, Ro09-0198, duramycin, and ancovenin. The antibiotic nisin is a polypeptide and may be soluble in aqueous environments. Nisin can be produced, for example, by fermentation of the bacterium *Lactococcus lactis* in a milk-based medium.

Natural antimicrobial agents such as nisin are commercially available as natural antimicrobial compositions that include the active antimicrobial agent (e.g., nisin) in combination with other ingredients used to prepare the antimicrobial agent. The other ingredients could include residual bacteria cells, residual substrate, and other by-products. One source of natural antimicrobial compositions is Aplin and Barrett, Ltd., Beaminster, Dorset, UK, who sell a product under the trade name NISAPLIN. NISAPLIN may provide nisin in an all-natural composition including approximately 2.5% nisin, 77.5% sodium chloride, 12% protein, 6% carbohydrate, and 2% moisture. This exemplary commercial product composition is not limiting, and other compositions that contain nisin or other natural antimicrobial agent, in different amounts and with different co-ingredients, can also be useful according to the invention. Other examples of commercially available natural antimicrobial materials include MicroGard CSI-50 and 730.

When an antimicrobial agent composition is used in a batter product as described, the amount of the antimicrobial agent composition (containing antimicrobial agent in combination with other ingredients used to prepare the antimicrobial agent) can be any amount that provides sufficient antimicrobial action to improve shelf life of a batter. One particular natural antimicrobial agent is a microbial fermentate product created by allowing selected strains of lactic acid bacteria to ferment sugar and produce bacteriocin compounds (small peptides capable of disrupting cell membrane integrity of selected species of bacteria—pathogens). One example of such a microbial fermentate is the MicroGard CS1-50 antimicrobial product available commercially from Danisco.

The amount of a microbial fermentate used in a batter can be an amount effective to provide antimicrobial performance, including refrigerated stability of a batter as described herein over refrigerated storage periods. When the antimicrobial agent is included as a MicroGard antimicrobial agent composition, an amount of the MicroGard antimicrobial agent composition that will function to provide stability over a refrigerated storage period as described, may be from about 0.1 weight percent to about 1.5 weight percent MicroGard based on the total dough weight of dough composition, e.g., from 0.3 to 0.7 weight percent. A preferred range for MicroGard may be from about 0.4 weight percent MicroGard to about 0.6 weight percent, based on the total weight of the dough composition.

A preferred batter can be in the form of an oil-in-water emulsion that is stable at refrigerated conditions and capable of maintaining the form of an emulsion for extended periods of refrigerated storage without significant phase separation. An emulsifier can be included in the batter to produce a stable emulsion. The emulsifiers can be any emulsifier known in the food arts and capable of producing a batter as described in the form of a refrigerator stable oil-in-water emulsion; examples include nonionic, anionic, and/or cationic surfactants. More specific examples include sodium stearoyl lactylate, sorbitan monostearate, polysorbate 60, polysorbate 80, lecithin, mono- and diglycerides of fatty acids, propylene glycol mono- and diesters of fatty acids, glyceryl-facto esters of fatty acids, ethoxylated mono- and diglycerides, DATEM (diacetyl tartaric acid ester of mono- and diglycerides, and the like. The emulsifier can be included in the batter in any useful amount, such as in a range from about 0.02 to about 2 weight percent, e.g., from about 0.03 to 1.5 weight percent, or from about 0.04 to about 1 weight percent emulsifier based on the total weight of the batter.

|  | % Bisquick Complete Pancake and Waffle Dry mix | % Invention (ready to use) Pancake Batter |
|---|---|---|
| Select dry ingredients | 36-40 | 36-40 |
| Sorbitol | 0 | 2-4 |
| Glycerine | 0 | 6-10 |
| Sugar | 2-6 | 4-8 |
| Water | 54-58 | 36-40 |
| Oil | 1-4 | 6-10 |
| glucose oxidase | 0 | 0.25 to 1 GODU/gram |
| TOTAL | 100 | 100 |

Dry ingredients include flour, starch, sweet whey, albumen, soda, SALP, salt, MicroGard CS1-50, and sorbitol. Sugar is listed separately and not included in the dry ingredients.

Actual Comparison

|  | % Bisquick Complete Pancake and Waffle Dry mix | % Invention (ready to use) Pancake Batter |
|---|---|---|
| Select dry ingredients | 37.53 | 37.56 |
| Sorbitol | 0 | 3.15 |
| Glycerine | 0 | 8.24 |
| Sugar | 3.93 | 5.57 |
| Water | 56.36 | 37.56 |
| Oil | 2.18 | 7.92 |
| glucose oxidase | 0 | 0.5 GODU/gram |
| TOTAL | 100 | 100 |

The batter can be particularly useful when contained in re-sealable or re-closable dispensing container or package. The container may contain headspace, or may not. A package that does not contain headspace may be of a variable internal volume with the volume decreasing as batter contained in the package is removed from the package. For example, a container may be a re-sealable flexible, plastic bag or pouch from which batter can be removed and the bag re-sealed; as batter is removed from the flexible package, the internal volume of the flexible package is reduced by the amount of the volume of the removed batter.

Certain preferred embodiments of packaged batter products include batter in a squeeze container or squeeze package that includes resilient (squeezable) sidewalls and an opening through which batter can be expelled from the interior volume by squeezing the sidewalls. The package also preferably contains a re-sealable closure at the opening, which can be opened to allow batter to be removed from the interior, then closed to allow the remaining batter to be contained inside of the re-sealed package for subsequent refrigerated storage. Before the package is re-closed, after batter is removed, the resilient sidewalls will normally return to their original shape in a manner to draw ambient air into the package to fill the headspace of the package.

Product dispensers such as plastic squeeze bottles (a.k.a., squeeze containers), are known for use in dispensing liquid or otherwise flowable products such as food products (e.g., syrups, ketchup, mustard, jelly, other condiments such as pickle relish). Such plastic squeeze bottles typically have a top and resilient sidewalls that together define an interior volume for containing the product until dispensed. A dispensing orifice typically extends through the top of the plastic squeeze bottle for passing the flowable product from the bottle. External pressure is usually applied to the resilient sidewalls of the plastic squeeze bottle to urge the product to flow therefrom. After a portion of the product (e.g., batter) is dispensed from a plastic squeeze bottle, releasing the pressure applied to the resilient sidewalls to allow the sidewalls to return to their original shape will draw air into the plastic container, filling headspace of the container ("headspace" is the portion of the interior volume that does not contain batter). Each time that a portion of the product (e.g., batter) is removed from the package, an additional amount of air is drawn into the package to replace the removed product (e.g., batter). Drawing air into the package exposes the contained product (e.g., batter) to the ambient air, and can a reduced shelf life of many food products. As explained, the batter product described herein can exhibit extended refrigerated storage stability even after air has been drawn into the container interior to replace batter that has been removed for use.

A packaged batter product, and method, are provided for dispensing batter from a container such as a plastic squeeze bottle. The package can be characterized as including a bottom, a top, and resilient sidewalls extending between the bottom and the top. An opening and an optional re-sealable closure are present at a surface of the package to allow the package to be opened, to allow batter to be removed from the opened package, and then to allow the opening to be re-closed or sealed, after which the package can be subsequently stored at a refrigerated condition. During use that includes removing batter from the opened package, air can displace the removed batter, filling headspace that is created by removal of batter.

Figure 1:
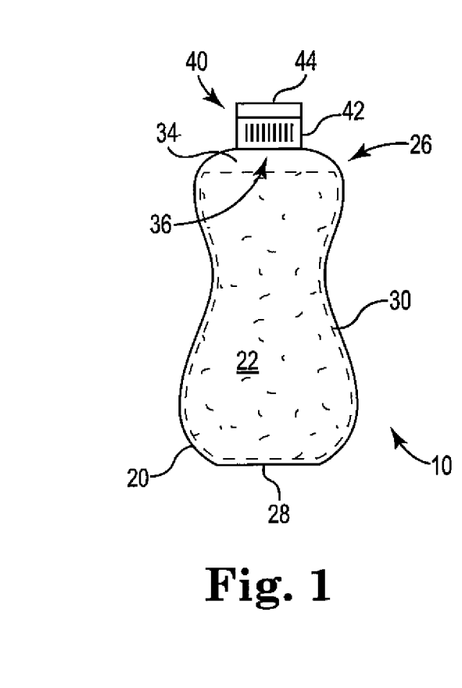
FIG. 1 illustrates a packaged batter product.

Referring to FIG. 1, illustrated is packaged batter product 10, including squeeze bottle 20 and batter 22 contained in an interior volume of bottle 20. Squeeze bottle 20 includes bottom 28, resilient sidewalls 30, and top 26, which together define an interior volume that contains batter 22 and optional headspace 34. An opening 36 is present at top 26, extending from the interior volume of bottle 20 to an exterior location. Also located at top 26 is cap 40, which covers opening 36 and includes a lower portion 42 attached to top 26 (e.g., by a threaded or other mechanical engagement), and upper portion 44. Cap 40 can be opened and closed to allow opening 36 to be opened, to in turn allow batter to be passed through opening 36 as desired. Cap 40 as illustrated is a single example of a re-sealable closure, and other examples are also known and useful.

Figure 2:
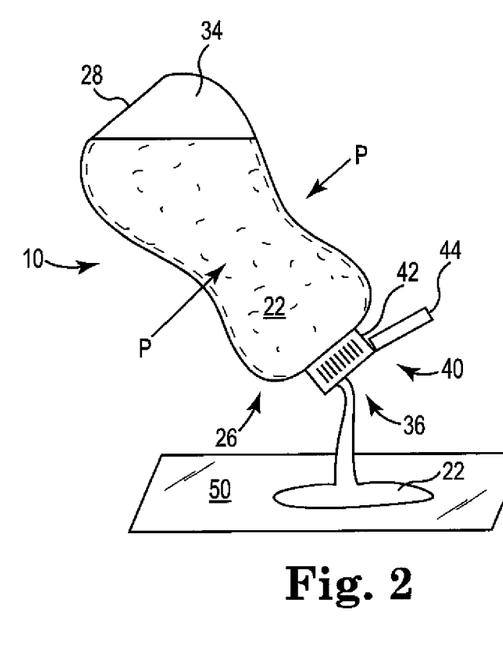
FIG. 2 illustrates a method as described, with dispensing batter from a re-sealable package.
Figure 3:
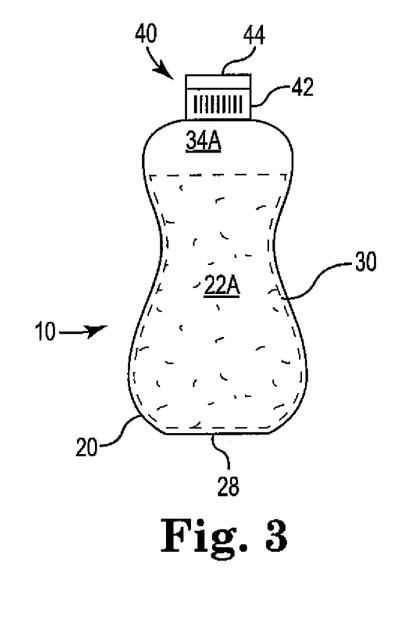
FIG. 3 illustrates a packaged batter product.

In use, upper portion 44 of cap 40 can be removed or displaced from lower portion 42 to open or uncover aperture 36 at the top of squeeze bottle 20. Squeeze bottle 20 can be positioned as desired, e.g., inverted, and pressure (arrows P at FIG. 2) can be placed on sidewalls 30 to urge sidewalls 30 together in a manner that will reduce the size of the interior volume of squeeze bottle 20. See FIG. 2. FIG. 2 shows inverted squeeze bottle 20 with batter 22 flowing from aperture 36 onto a cooking surface 50. A portion of batter 22 is removed, and a portion of batter 22A remains inside of squeeze bottle 20. See FIG. 3. Upper portion 44 of cap 40 can be closed (or bottle 20 can otherwise be re-sealed), to contain the reduced amount of batter 22A, and an increased amount of headspace 34A, which will contain an ambient air drawn in to the interior of bottle 20 when sidewalls 30 return to their original (un-deflected) state. Afterward, packaged batter product 10, containing increased headspace 34A, can be refrigerated for an extended refrigeration period, with stability as described herein.

A packaged batter product can be prepared by any useful method of adding batter to a package (e.g., a re-sealable squeeze package or squeeze container 20), and sealing the container. By various methods a packaged batter product (e.g., 10) can be prepared by providing the package, filling the package with batter, allowing for an optional volume of headspace in the filled package (e.g., less than 20, 10, or 5 percent of the total internal volume of the package), and sealing the package with a closure (optionally a re-sealable closure) to contain the batter and optional headspace. This package, upon being initially filled and initially sealed, can be referred to as an "initially filled sealed package," meaning the package is filled by way of a commercial production process to contain an initial amount of batter and an optional amount of initial headspace that is preferably less than 20 percent, e.g., less than 10 percent or less than 5 percent, and is then sealed by placing a re-sealable closure on the filled container.

Advantageously, preferred embodiments of batters as described do not require and can specifically exclude any form of anti-microbial temperature (heat or cold), pressure, or irradiation treatment during any stage of manufacture or storage, capable of killing or inactivating biologically active organisms or biologically active compounds such as microbes, bacteria, fungus, spores, yeast, mold, etc. Many forms of heat treatment, cold, pressure, and vacuum treatments, are used to improve storage stability of food products by destroying microorganisms, destroying or inactivating spores, or destroying or inactivating otherwise potentially undesirable biologically active materials such as active enzymes, yeasts, proteins, etc. Examples of high pressure processing steps and high pressure processing equipment are described at U.S. Pat. No. 8,063,687 (use of pressure (e.g., 350 to 1000 megapascal (MPa)) to prevent or reduce undesired growth of microorganisms), and US published patent application 2011/0070341 (use of pressure (e.g., 400 to 600 megapascal (MPa) for a time (a few minutes) to destroy microorganisms). The present methods and batter products do not require and can specifically exclude any step of exposing a batter or batter ingredient to such high pressure processing to control microbial activity. Examples of high temperature processing (e.g., pasteurization) are described at WO2002037970 (describing a "stabilizing period" of 2 to 10 minutes at a temperature from 60 C to 72 C). The present methods and batter products do not require and can specifically exclude any step of exposing a batter, batter ingredient, or packaged batter product to such high temperature (e.g., greater than 60 C, or greater than 100 C) processing in a manner and for a period of time that would allow the batter do achieve that temperature and cause inactivation of microorganisms (e.g., bacteria, fungus, spores, yeast, mold) in the batter. The present methods, batter, and packaged batter products also do not require and can specifically exclude the presence of a concentrated inert gas atmosphere, with low oxygen content, in a package headspace to prolong storage stability. Examples of the use of a concentrated inter gas, low oxygen atmosphere to improve storage stability are described at U.S. Pat. No. 6,759,070 (describing an "inerting" process to improve shelf stability of a food product).

None of these is necessary, and all can be specifically excluded from preferred embodiments of batters and packaged batter products as described. The present batter products are not required to include any such processing applied to any ingredient (e.g., flour) thereof, to the prepared batter composition itself, or to the prepared batter composition within a package.

Specifically regarding pressure conditions of the batter and packaged batter product, the batter does not require a pressurized atmosphere or pressurization of the interior of the packaged batter product, e.g., to inhibit or prevent microbial growth. A pressurized container is considered to be a container that is closed and sealed to contain a pressure greater than ambient, e.g., greater than about 1 atmosphere (absolute); preferred containers of this description are non-pressurized, and the interior space and contents during use and manufacture are periodically exposed to ambient (atmospheric) conditions. The batter and packaged batter products can be prepared, filled, processed, stored, transported, and used and stored (with refrigeration) by a consumer, entirely at ambient (e.g., atmospheric) pressure. The package is not pressurized but is initially closed and sealed, and can be closed and sealed after initial opening and use of a portion of its contents, all the while by exposure to ambient atmospheric pressure. Preferred embodiments of the packaged batter product also can exclude the use of a pressurized can, as described at U.S. Pat. No. 3,620,763 (describing a packaged batter contained in a can having an internal pressure of from about 10 to about 20 psi (gauge)).

According to various embodiments, the internal volume of the filled sealed package may contain entirely batter with no headspace, or may alternately contain an initial volume of the batter and an initial volume of headspace (preferably air). The term "filled" with respect to the term "initially filled sealed package" refers to the package that is initially filled to contain an amount of the batter as initially added to the package, before initially sealing the package (such as during a commercial production process), and that may also optionally and typically contain an amount (volume) of original headspace, e.g., up to about 20 percent by volume, preferably less than 15 percent by volume, e.g., from 5 to 10 percent by volume.

The term "re-sealed" refers to the packaged batter product during use by a consumer, specifically referring to the packaged batter product after the initially filled sealed package, with a re-sealable closure, has been opened a first time ("initially opened"), a portion of the originally contained batter has been removed from the interior volume of the opened package, the volume of the removed batter has been replaced by air such that the package contains an increased headspace, and the re-sealable closure is sealed again (i.e., re-sealed). The amount (volume) of the increased headspace is equal to the volume of the initial headspace, plus the volume of the removed batter.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

The following examples are illustrative and non-limiting.

EXAMPLES

Batter was prepared according to the following table.

| Ingredient | grams | % weight of total |
| --- | --- | --- |
| Flour, soft | 618 | 14.976% |
| Flour, hard | 425 | 10.299% |
| Modified Starch | 322.56 | 7.817% |
| Sweet Whey Dried | 2 | 0.048% |
| Albumen | 60 | 1.454% |
| Sodium bicarbonate | 30.56 | 0.741% |
| SALP | 24.6 | 0.596% |
| Salt | 36.6 | 0.887% |
| MicroGard CS1-50 | 20 | 0.485% |
| Total Dry Weight | 1539.32 | 37.303% |
| Water | 1550 | 37.562% |
| Soybean oil | 326.92 | 7.922% |
| Sucrose | 230 | 5.574% |
| sorbitol | 130 | 3.150% |
| Glycerine | 340 | 8.239% |
| Sorbate | 1.8 | 0.044% |
| Propionate | 3.68 | 0.089% |
| DATEM Panodan 150 | 2.28 | 0.055% |
| Xanthan MAS-SH | 2.28 | 0.055% |
| Glucose Oxidase (Gluzyme 10000 BG) | 0.21 | 0.005% |
| Total Emulsion Weight | 2587.17 | 62.697% |
| Total Batch Weight | 4126.49 | 100.000% |

The ingredients were formed into a batter as follows:
Process—Stephan Mixer Model VCM12
1) Heat oil to 140 F to 160 F. Mix (melt) DATEM in oil (140-160° F.). Allow to cool to (~80-90° F.).
2) Combine oil/DATEM mixture with water in bowl and mix at 22.63 Hz (fast)for 1 minute.
3) Add the following to mixture and mix at 22.63 Hz for 1 minute:
   xanthan
   sucrose
   glucose oxidase
   propionate
   sorbate
   and sorbitol
4) Add glycerine to mixture and mix at 22.63 Hz (fast) for 1 minute.
5) Add remaining ingredients and mix at ~8-10 Hz (slow) for 20 seconds.

Bottle immediately after mixing in a closed (re-sealable) packages.

During the entire process, before testing, the batter was prepared, packaged, and passed to testing without exposing the batter to any step of freezing, heat, pressure, or vacuum treatment for the purpose of reducing microbial activity, reducing enzyme activity, killing spores, denaturing, or otherwise eliminating activity of biologically active compounds or organisms. All steps of pre-preparation of ingredients, ingredient mixing, packaging, storing, and other pre-testing steps were performed at ambient pressure (atmospheric conditions) and at temperature ranging from refrigerated temperature (e.g., from not lower than 38 F, to 45 F) to room temperature (e.g., not exceeding about 72 F). More specifically, the preparation, processing, and testing did not include any step that would function to pasteurize the batter, or to kill spores, reduce microbial activity, reduce enzyme activity, denaturing, or otherwise eliminating activity of biologically active compounds or organisms by temperature, pressurization, or vacuum.

Testing was performed to assess the effect of batter fill volume in a package, on headspace gas composition (pressure), over time at 40° F.

The testing showed that enzymatic manipulation of pancake batter headspace gas composition, using glucose oxidase, results in the removal of gaseous oxygen from the headspace. This enables the off-gassing of carbon dioxide from the batter with minimal change in overall headspace pressure. Furthermore, upon removal of most or approximately the entire amount of gaseous oxygen from the headspace, additional out-gassing of carbon dioxide from the batter into the closed headspace effectively halts.

For the 100 percent fill (128 cc headspace) sample set only 4 percent of the total soda added to the bottle reacted to produce carbon dioxide gas over the study period. The resulting closed bottle containing the batter and headspace displayed no signs of bulging or of being pressurized, and opened easily without a notable release of pressure. The observed extent of soda reaction and carbon dioxide out-gassing into the bottle headspace correlate to the volume of oxygen gas consumed by glucose oxidase (greater headspace volume resulted in more oxygen removal, and more carbon dioxide released). Headspace volume had no discernible effect on product performance vs. storage time; i.e., additional glucose oxidase activity due to a larger volume of headspace (containing a greater quantity of oxygen gas) did not show any significant affect on batter product and package stability and performance.

The batter is a ready-to-use refrigerated batter (see table above). The sample included 12 separate batches, each prepared in an amount of 4 kilograms. The batter was filled into re-sealable bottles having a total volume of about 810 cubic centimeters, to an amount that left different amounts of headspace in the filled container. The three different amounts of batter added to bottles to fill the bottles were: 100% (leaving 128 cubic centimeters in headspace), 75% (leaving 308 cc in headspace), and 50% (leaving 433 cc in headspace). Approximately 20 bottles were filled per fill weight (a total of 60 bottle were filled with the three different amounts of batter).

| Batter gm | Average Headspace Volume (cc) |
|---|---|
| 677-683 | 128 |
| 507-513 | 308 |
| 337-343 | 433 |

*Headspace Analysis - Drilled small hole in headspace portion of bottle and measured percent gaseous carbon dioxide and percent gaseous oxygen, using a PBI Dansensor (CheckMate 9900).

Figure 4:
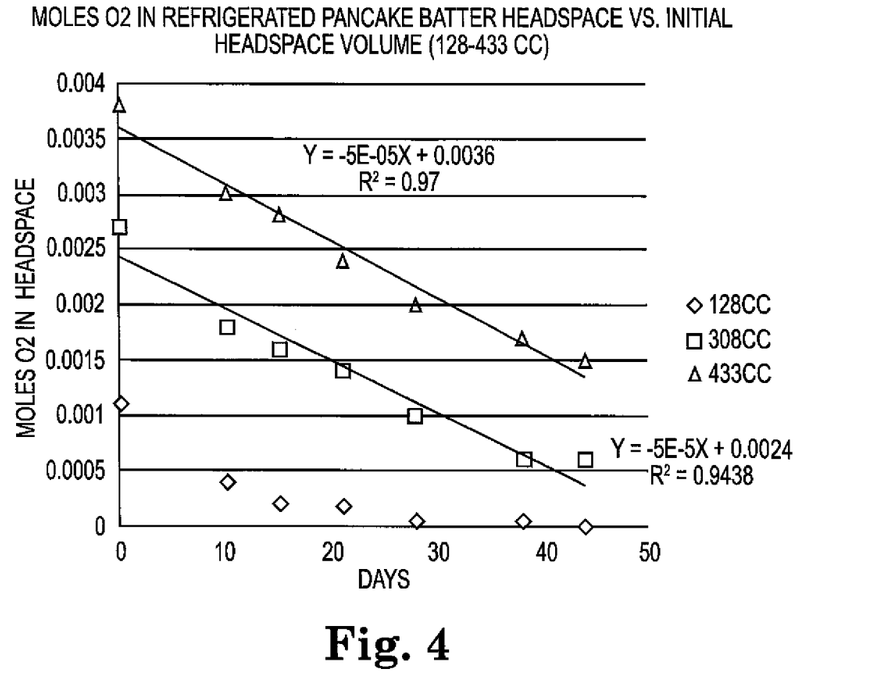
FIG. 4 is a graph showing moles of gaseous oxygen in package headspace.

As shown in the table at FIG. 4, the initial rate of oxygen consumption by the glucose oxidase is independent of initial headspace volume; the initial rate is consistent for all three headspace volumes, and is about 0.00005 moles of gaseous oxygen removed per day at 40° F. Gaseous oxygen is completely removed from the 128 cc headspace sample after about 28 days, which correspond to a removal of about 26.88 cubic centimeters of oxygen gas from the headspace.

Figure 5:
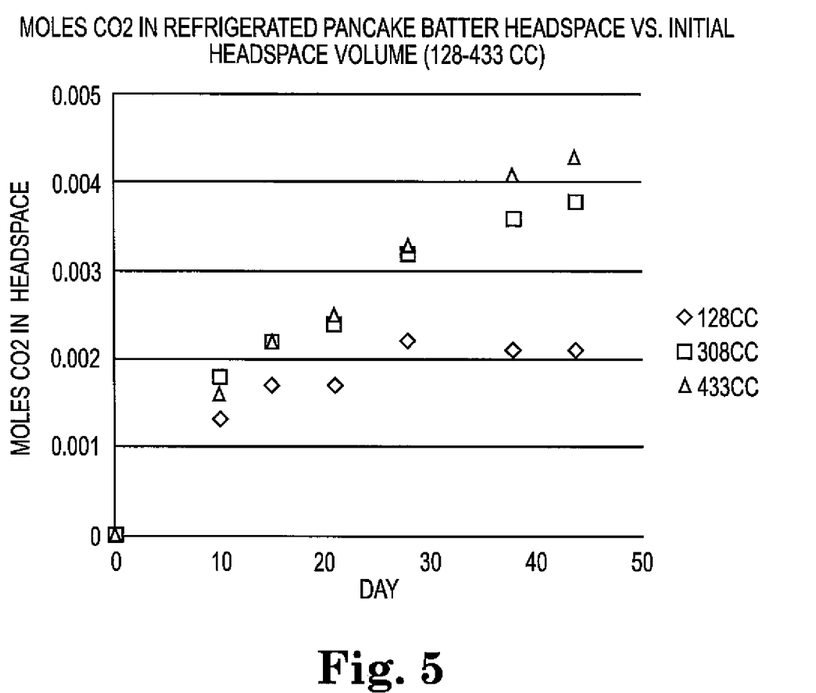
FIG. 5 is a graph showing moles of gaseous carbon dioxide in a package headspace.

The graph of FIG. 5 shows that carbon dioxide gas is released from batter into the bottle headspace (due to reaction of soda with SALP) at an initial rate of about 0.00009 moles carbon dioxide per day at 40° F. The total amount of carbon dioxide released is a function of the initial headspace volume in the bottle and, more specifically, the total amount of gaseous oxygen that is enzymatically consumed by glucose oxidase. Once all of the gaseous oxygen is removed from the bottle headspace (after about 30 days for the 128 cubic centimeter headspace sample), carbon dioxide release from the batter is effectively halted in the 128cc sample set. See FIG. 6.

Figure 6:
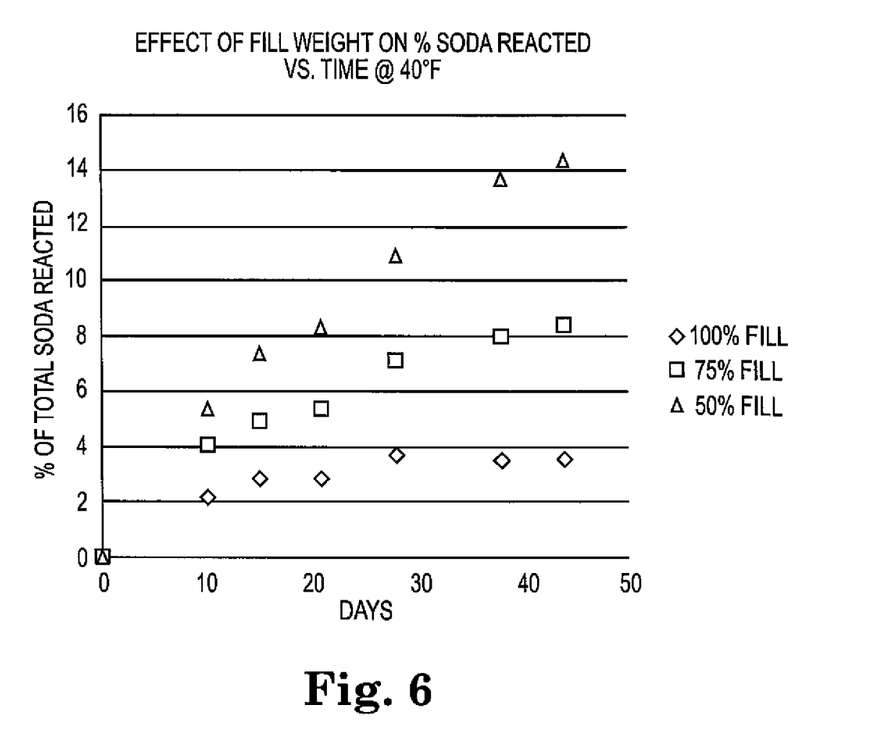
FIG. 6 is a graph showing amounts of basic chemical leavening reacted over time.

FIG. 6 shows the percentage of total soda in a batter that is reacted and released as carbon dioxide gas in a function of the percent fill and the bottle headspace volume. For the 100 percent fill sample (having a headspace of about 128 cubic centimeters), about 4 percent of the total soda in the batter reacts and is released into the headspace. After about 30 days, no further amount of carbon dioxide is released. The amount of headspace and the amount of available oxygen gas that may be consumed, limit the percentage of total carbon dioxide released from the batter.

Figure 7:
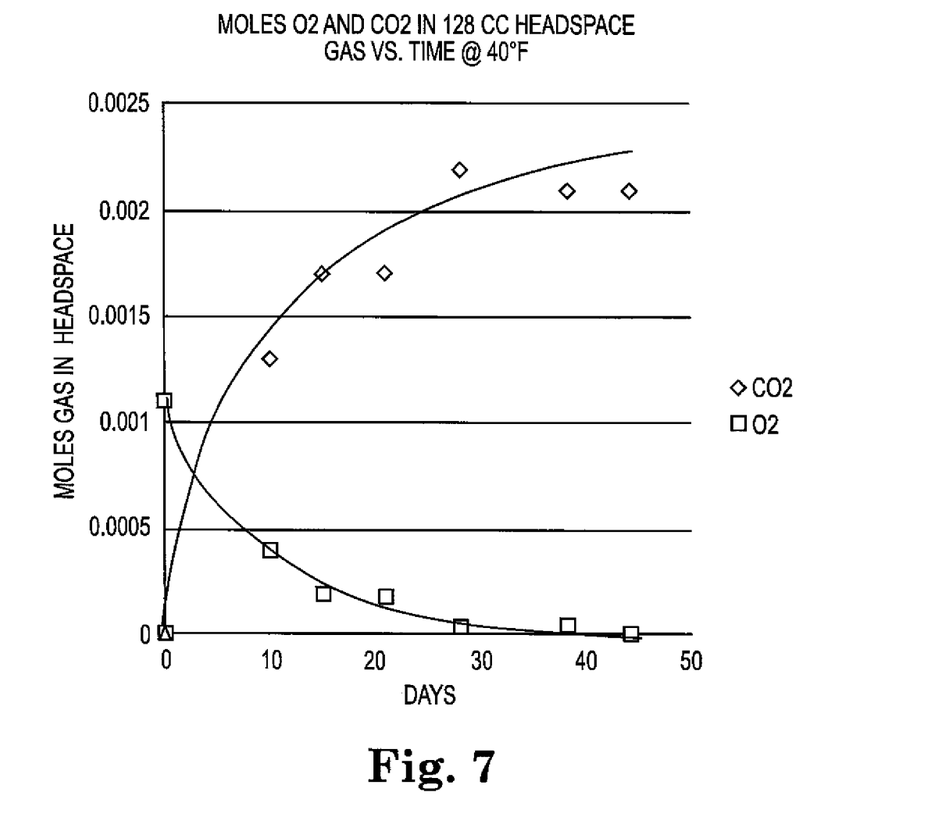
FIG. 7 is a graph showing moles of gaseous oxygen and moles of gaseous carbon dioxide in package headspace over time.

FIG. 7 shows that slightly less than 2 moles of carbon dioxide gas are released for every 1 mole of gaseous oxygen ($O_2$) that is consumed from the headspace. The net result is that the bottle does not become noticeably pressurized or distended, i.e., gives no observable sign of being pressurized, during refrigerated storage periods over the tested range. Removal of oxygen the limits percentage of carbon dioxide gas that is released from the batter and mitigates pressure concerns.

Figure 8:
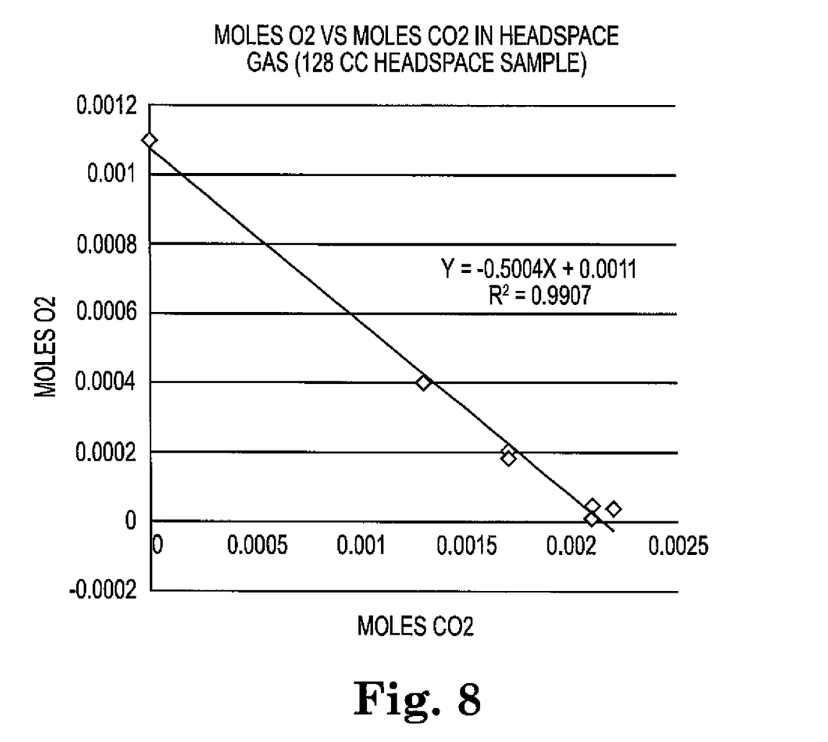
FIG. 8 is a graph showing moles of gaseous oxygen relative to moles of gaseous carbon dioxide in package headspace.

FIG. 8 is a graph that shows gaseous oxygen removed from a package headspace, versus carbon dioxide released into the headspace gas, is linear with a slope of about −0.5 (about 2 moles carbon dioxide are released for every 1 mole gaseous oxygen removed from the headspace). Upon removal of all the oxygen in the headspace, carbon dioxide release effectively halts (FIG. 6).

Yield Stress Versus Water Activity

The following work was performed to illustrate the inventive discovery of controlling yield stress independently from water activity.

Three batter compositions were prepared. A first Control box batter, which was the Betty Crocker Formulation specified below, a dry mix combined with water.

A second batter was made from the Betty Crocker box mix, modified to reduce the water activity to about 0.9. This batter was prepared from the Betty Crocker complete pancake batter, which was the same as the Control, but the water activity was reduced by using technology as outlined in the Hahn U.S. Pat. No. 6,217,929, by adding glycerine, maltodextrin, sugar, etc.

A third batter was made according to the present invention, to exhibit a water activity of about 0.9.

The table below shows the yield stress values for the inventive batter, control box mix batter, and the aforementioned Betty Crocker box mix batter modified to exhibit a water activity value comparable to the inventive batter at ~0.9.

| Technology/ Batter | Yield Stress value (Pa) |
|---|---|
| Control box mix (aw ~0.97) | 6.204 |
| Invention batter (aw ~0.9) | 8.46 |
| Low aw Betty Crocker box mix using Hahn technology (aw ~0.9) | 20.3 |

These results show that previously known methods of trying for reducing water activity of a batter, meaning adding a humectant such as sugar or alcohols, will increase the yield stress of a refrigerated batter, while the present invention can desirably produce a refrigerated batter having both low yield stress and low water activity.

Betty Crocker Formulation Used:

|  | % | gm |
|---|---|---|
| Pancake mix | 42.21 | 168.84 |
| water | 32.59 | 130.36 |
| glycerine | 5 | 20 |
| Corn syrup solids 24 DE | 10.2 | 40.8 |
| Sucrose | 10 | 40 |

Combined water and glycerine prior to adding remaining ingredients (mixed until smooth). Refrigerated for about 3 days prior to yield stress testing.

The invention claimed is:

1. A packaged emulsion product comprising a package comprising a re-sealable closure and an internal volume that contains an edible oil-in-water emulsion comprising flour, sugar, acidic chemical leavening agent, basic chemical leavening agent, oil, water, an oxidoreductase enzyme and emulsifier, having a water activity below 0.93, and having a yield point of not greater than 20 Pascals, wherein the sugar consists essentially of di-saccharides and the package containing the oil-in-water emulsion, before opening the package, has less than 20 percent headspace, and wherein the package maintains a pressure of between 13 and 16 psi after opening and reclosing during a refrigerated storage period of at least 2, 4, or 6 weeks at a temperature of 38 to 45 degrees F.

2. A packaged emulsion comprising a package comprising a re-sealable closure and an internal volume that contains an edible oil-in-water emulsion comprising flour, sugar, acidic chemical leavening agent, basic chemical leavening agent, oil, water, an oxidoreductase enzyme and emulsifier, having a water activity below 0.93, 2-10 weight percent sugar and a sugar to water ratio in a range from 0.3/1 to 0.7/1, wherein the package containing the oil-in-water emulsion, before opening the package, has less than 20 percent headspace, and wherein the package maintains a pressure of between 13 and 16 psi after opening and reclosing during a refrigerated storage period of at least 2, 4, or 6 weeks at a temperature of 38 to 45 degrees F.

3. The packaged emulsion product as recited at claim 1 wherein the sugar consists of sucrose.

4. The packaged emulsion product as recited at claim 1 further comprising a non-sugar water-activity reducing agent consisting essentially of polyhydric alcohol having six or fewer carbon atoms.

5. The packaged emulsion product as recited at claim 1 further comprising a non-sugar water-activity reducing agent consisting essentially of polyhydric alcohol selected from glycerol, sorbitol, and combinations thereof.

6. The packaged emulsion product as recited at claim 1 having a water activity in a range from 0.90 to 0.92.

7. The packaged emulsion product as recited at claim 1 wherein the oil-in-water emulsion constitutes a pancake batter which exhibits a yield point of not greater than 20 Pascals after a refrigerated storage period of four weeks.

8. The packaged emulsion product as recited at claim 1 comprising:
from 23 to 27 weight percent flour,
from 3 to 7 weight percent sugar,
from 9 to 13 weight percent non-sugar water-activity reducing agent,
from 0.4 to 1 weight percent acidic chemical leavening agent,
from 0.5 to 1 weight percent basic chemical leavening agent,
from 6 to 10 weight percent oil, and
from 36 to 40 weight percent water.

9. The packaged emulsion product as recited at claim 2 wherein the oxidoreductase enzyme is glucose oxidase enzyme.

10. The packaged emulsion product as recited at claim 1 having a sugar to water ratio in a range from 0.3/1 to 0.9/1 and having 2-10 weight percent sugar.

11. A method of using a packaged emulsion product, the packaged emulsion product comprising a package comprising a re-sealable closure and an internal volume that contains an edible oil-in-water emulsion comprising flour, sugar, acidic chemical leavening agent, basic chemical leavening agent, oil, an oxidoreductase enzyme, water, and emulsifier, in the form of a stable oil-in-water emulsion, wherein the sugar consists essentially of di-saccharides, with the edible oil-in-water emulsion having a water activity below 0.93 and a yield point of not greater than 20 Pascals and a sugar to water ratio in a range from 0.3/1 to 0.9/1, the method comprising:
opening the package by opening the re-sealable closure,
removing a portion of the edible oil-in-water emulsion from the package in a manner that increases headspace in the package,
allowing air to fill the increased headspace,
re-closing the re-sealable closure so the package contains the increased headspace filled with air, and
storing the re-closed package at a refrigerated condition, wherein, before opening the package, the package has less than 20 percent headspace, and wherein the package maintains a pressure of between 13 and 16 psi after opening and reclosing during a refrigerated storage period of at least 2, 4, or 6 weeks at a temperature of 38 to 45 degrees F.

12. The method according to claim 11 wherein, before opening the package, the sealed filled package contains a batter and not more than 15 percent initial headspace.

13. The method according to claim 11 wherein the removing step comprises squeezing sides of the package to reduce an interior volume of the package and cause the edible oil-in-water emulsion to flow through the opened re-sealable closure.

14. The method according to claim 13 wherein after the sides of the package are squeezed and the edible oil-in-water emulsion is removed, the interior volume increases and draws air into the interior volume through the opened re-sealable closure, and the method comprises re-closing the re-sealable closure.

15. A packaged emulsion product comprising a package comprising a re-sealable closure and an internal volume that contains an edible oil-in-water emulsion comprising
from 23 to 27 weight percent flour,
from 3 to 7 weight percent sugar,
from 9 to 13 weight percent non-sugar water-activity reducing agent,
from 0.4 to 1 weight percent acidic chemical leavening agent,
from 0.5 to 1 weight percent basic chemical leavening agent,
from 6 to 10 weight percent oil,
an oxidoreductase enzyme, and from 36 to 40 weight percent water, and having a water activity below 0.93 and having a yield point of not greater than 20 Pascals, wherein the package containing the oil-in-water emulsion has less than 20 percent headspace, and wherein the package maintains a pressure of between 13 and 16 psi after opening and reclosing during a refrigerated storage period of at least 2, 4, or 6 weeks at a temperature of 38 to 45 degrees F.

16. The packaged emulsion product as recited at claim 15 wherein the sugar consists-essentially of sucrose, glucose, fructose, and combinations thereof.

17. The packaged emulsion product as recited at claim 1 having a sugar to water ratio in a range from 0.3/1 to 0.7/1.

18. The packaged emulsion product as recited at claim 15 wherein the sugar consists essentially of sucrose.

* * * * *